No. 646,284. Patented Mar. 27, 1900.
J. HILTON.
METAL CUTTING SAW.
(Application filed June 8, 1899.)
(No Model.)
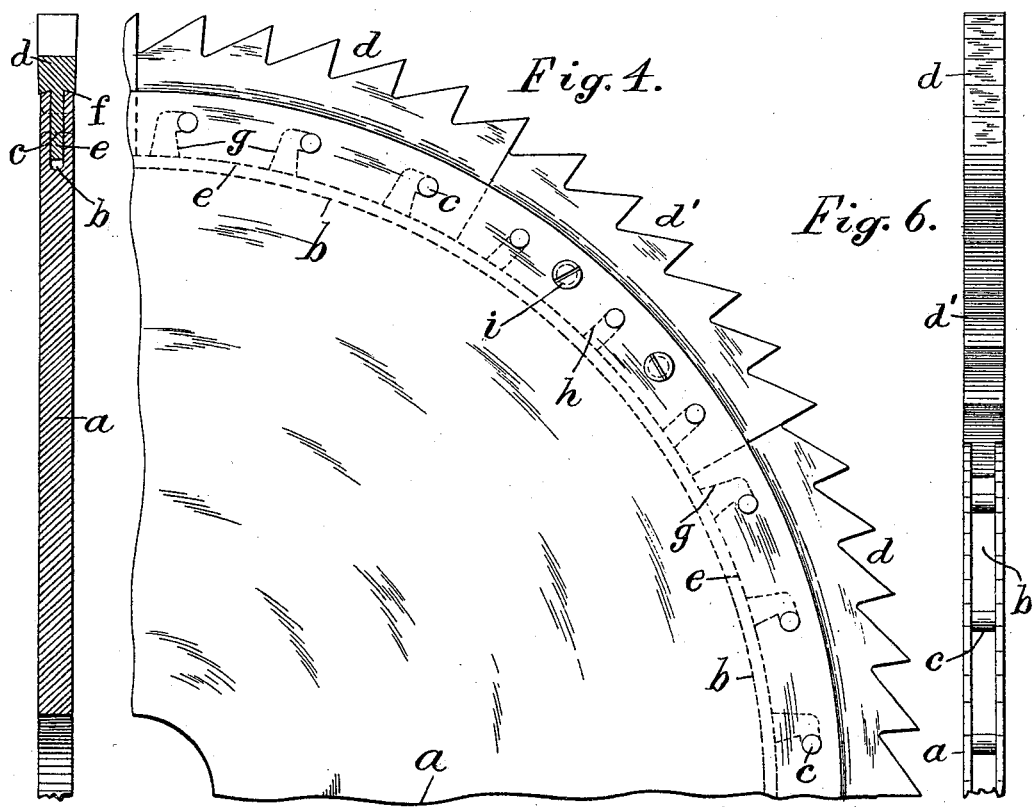

UNITED STATES PATENT OFFICE.

JAMES HILTON, OF NEWARK, NEW JERSEY.

METAL-CUTTING SAW.

SPECIFICATION forming part of Letters Patent No. 646,284, dated March 27, 1900.

Application filed June 8, 1899. Serial No. 719,756. (No model.)

*To all whom it may concern:*

Be it known that I, JAMES HILTON, a citizen of the United States, residing at Newark, county of Essex, State of New Jersey, have invented certain new and useful Improvements in Metal-Cutting Saws with Detachable Segments, fully described and represented in the following specification and the accompanying drawings, forming a part of the same.

The object of the present invention is to furnish a suitable construction for a metal-cutting saw; and the invention comprises a saw-plate with peripheral groove and rivets inserted transversely across the groove, with toothed segments having each a flange fitted to several of the rivets by bayonet-lock slots and one of the segments secured in place after all the others are locked to hold them firmly while in use.

In constructing a metal-cutting saw the requirements are entirely different from those for cutting wood, as the teeth upon a metal-cutting saw require to be much stronger than those upon a wood-cutting saw and to be held with the utmost firmness and rigidity, so that they may not chatter or vibrate in passing through the saw-kerf, which would cause them to catch and stick fast on account of the unyielding character of the material in which the kerf is made. The means for holding teeth removably in wood-cutting saws are not therefore adapted for metal-cutting saws, and the difficulties of holding removable teeth with sufficient firmness and rigidity have almost entirely prevented the use of detachable teeth in such saws. The saws used for cutting off bars of steel and iron in rolling-mills are therefore commonly made with integral teeth, and when the teeth are worn the saw has to be sent to the sawmaker and the temper drawn, so that the plate may be regummed. The plate then requires retempering to fit it for use, and the expense of thus repairing the saw is very great, as well as the risk of injury due to repeated tempering.

My invention has proved in practice able to hold the teeth detachably upon a saw-plate with the rigidity required to cut metal rapidly and also furnish a means of removing the teeth from the saw with great rapidity by locking them all upon the periphery of the saw with a single locking-section resembling a keystone. The locking-section is the only one secured positively to the plate, and its removal permits the immediate detachment of all the others by sliding the slots in each a little way along upon the pins which engage them.

The invention is shown in the annexed drawings, in which—

Figure 1 is a side view of the saw-plate prepared for the segments. This view is drawn one-quarter the size of the other figures, which are of the natural size for a small saw. Fig. 2 is a side view of the locking-segment. Fig. 3 is a side view of one of the segments with bayonet-lock slots. Fig. 4 shows a quadrant of the saw; Fig. 5, a transverse section of such quadrant upon its axial line, and Fig. 6 is an edge view of the quadrant with one of the segments removed.

$a$ designates the saw-plate, having parallel groove $b$ in its periphery, across which a series of rivets or pins $c$ is inserted in sufficient number to furnish two or three of such pins for each segment to be held thereby. The outer corners of the plate are beveled outwardly slightly, as shown in Fig. 5. The toothed segments $d\ d'$ are provided each with flange $e$ to fit snugly in the groove, and the shoulders $f$ of the segment are beveled inwardly to engage the beveled corners of the plate and hold the same from spreading at the opposite sides of the groove $b$. The bayonet-lock segments $d$ (shown in Fig. 3) are represented with three bayonet-lock slots $g$, each having a radial portion extended to the inner edge of the flange $e$, and also a longitudinal portion or head adapted to engage one of the pins $c$. When such segments are applied to the slot, three of the pins enter the three slots and are locked in the heads of the slots by pushing the segment a little way around the periphery of the plate, as shown in Fig. 4. The inner side of the slot-head is in practice sloped a very little, so that such engagement draws the shoulder $f$ close to the periphery of the saw-plate $a$ and grips the segment firmly thereto.

The locking-segment $d'$ (shown in Fig. 2) is provided merely with radial slots $h$, which are arranged to engage the pins $c$ only when the other segments have been all of them moved into their locked positions, and the securing of the locking-segment upon the plate then holds them all firmly in such positions. The locking-segment is secured to the plate by any convenient means, two screw-pins $i$ being shown in Fig. 4 inserted through holes $j$ in the saw-plate and holes $k$ in the locking-segment. The construction is very cheap, as the plain groove in the periphery of the saw-plate is easily formed, and the slots in the segments are made uniformly by stamping with suitable tools.

The invention is especially applicable to all heavy saws, in which a thick saw-plate is always employed, and it wholly avoids the tempering of the saw-plate and the subsequent expense of flattening the same. It also avoids the removal of the saw-plate from the driving-mandrel when the teeth have become worn, as the segments can be removed from the saw-plate and a fresh set inserted in a very few minutes.

The heads of the locking-slots $g$ are all extended from the body of the slot toward the forward end of the segment, or that to which all the teeth are pointed, whereby the cutting pressure upon the teeth holds the bayonet-slots upon the securing-pins $c$. The pins $c$ are preferably formed as rivets inserted through the plate across the groove $b$, with both ends headed flush with the surface of the plate, as shown in Fig. 5.

The pins $i$ are shown in Fig. 4 formed with heads, so that they may be provided with threads and screwed into place; but pins may be used without a head or screw-threads and riveted lightly in place, so as to be readily punched out when the keystone-section $d'$ requires removal.

Having thus set forth the nature of the invention, what is claimed herein is—

1. In a metal-cutting saw, the combination, with a plate having peripheral groove with series of pins or rivets inserted transversely across the same, of a series of detachable segments having each a flange fitted to the groove and provided with bayonet-locks to fit several of such pins, the head of the locking-slot being extended toward the points of the teeth in all of such segments, whereby the cutting pressure upon the teeth holds the locks upon the securing-pins, and a locking-section being secured to the saw-plate to hold the remaining sections engaged with such pins, substantially as herein set forth.

2. In a metal-cutting saw, the combination, with a circular plate, of a series of toothed segments secured thereon by bayonet-locks and all engaged by peripheral movement in the same direction, and a locking-section fitted closely between the remaining sections, and provided with means for securing it to the saw-plate, for holding the remaining sections engaged by such bayonet-locks.

3. In a saw, the combination, with the plate having peripheral groove with series of pins or rivets inserted transversely across the same, of a series of detachable toothed segments having each a flange fitted to the groove and provided with bayonet-locks to fit several of such rivets and a locking-section being secured to the saw-plate to hold the remaining sections engaged with such pins.

4. In a saw, the combination, with the plate having peripheral groove with series of pins or rivets inserted transversely across the same, of a series of detachable toothed segments having each a flange fitted to the groove and provided with bayonet-locks to fit several of such rivets and a locking-section secured detachably upon the periphery of the plate to hold the remaining sections locked upon the rivets.

5. In a saw, the combination, with the plate having peripheral groove with series of pins or rivets inserted transversely across the same, of a series of detachable toothed segments having each a flange fitted to the groove and provided with bayonet-locks to fit several of such rivets, and a locking-section with flange having straight or radial grooves to fit the rivets, and removable pins inserted through the plate and such flange to hold the locking-section detachably in place.

In testimony whereof I have hereunto set my hand in the presence of two subscribing witnesses.

JAMES HILTON.

Witnesses:
PERCY B. TAYLOR,
THOMAS S. CRANE.